Figure 3:
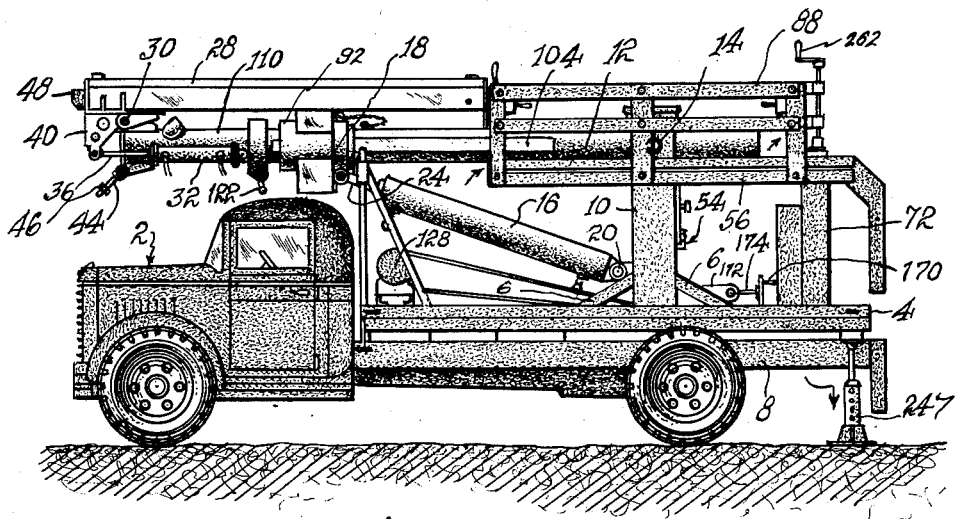

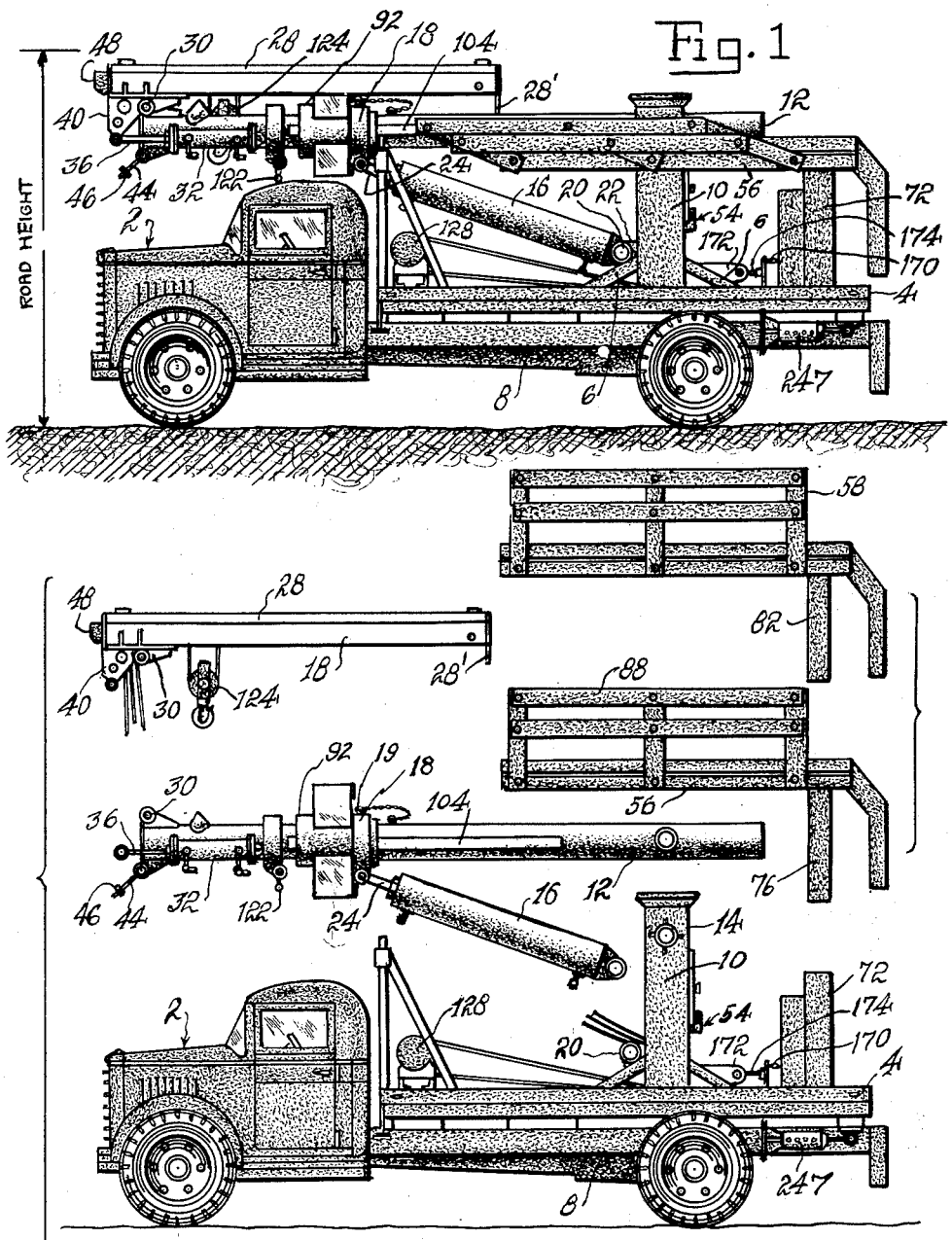

Feb. 18, 1964   F. LA BARRE, JR   3,121,499
AIRCRAFT PROPELLER HANDLING UNIT
Filed Oct. 7, 1960   11 Sheets-Sheet 2

INVENTOR.
FLOYD LaBARRE Jr.
BY
William V. Ebs
ATTORNEY.

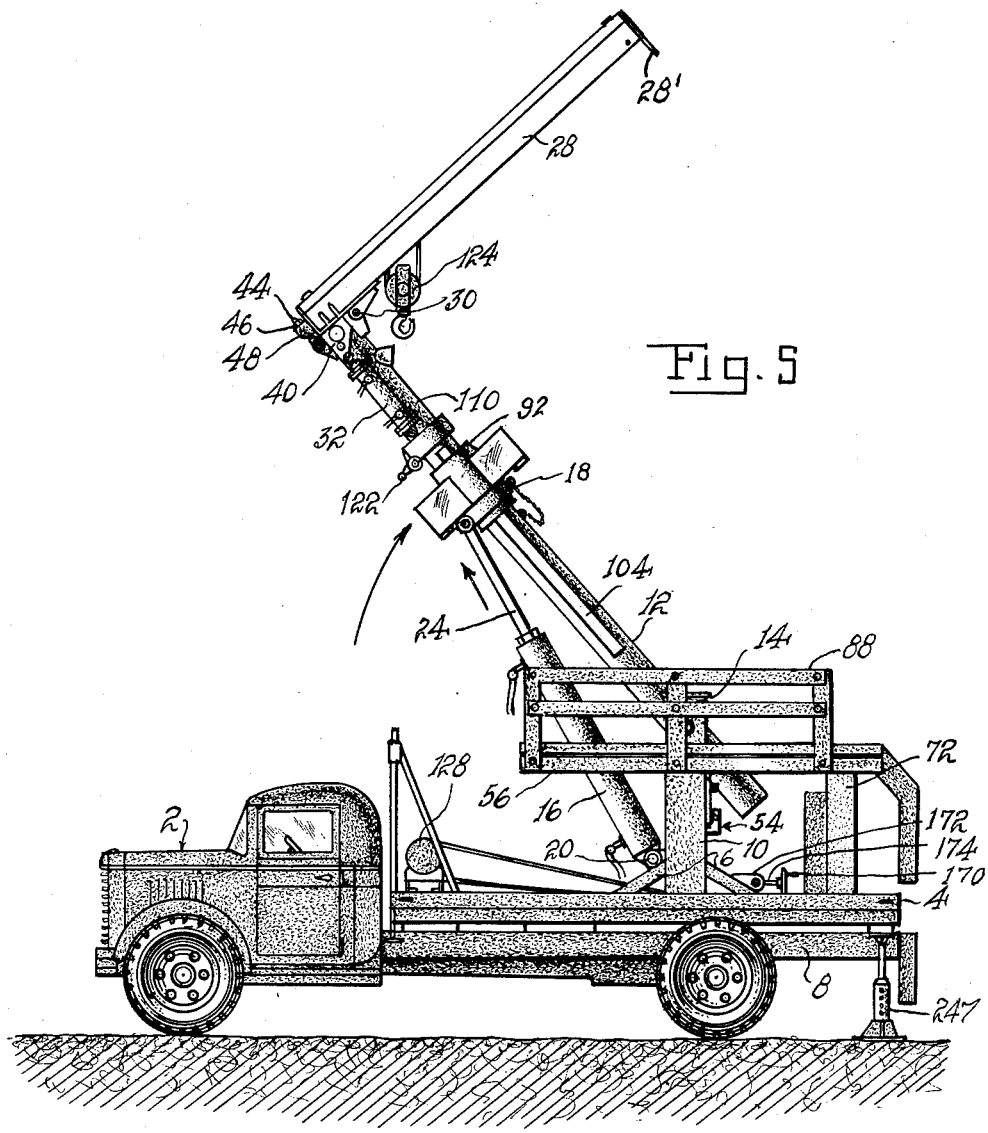

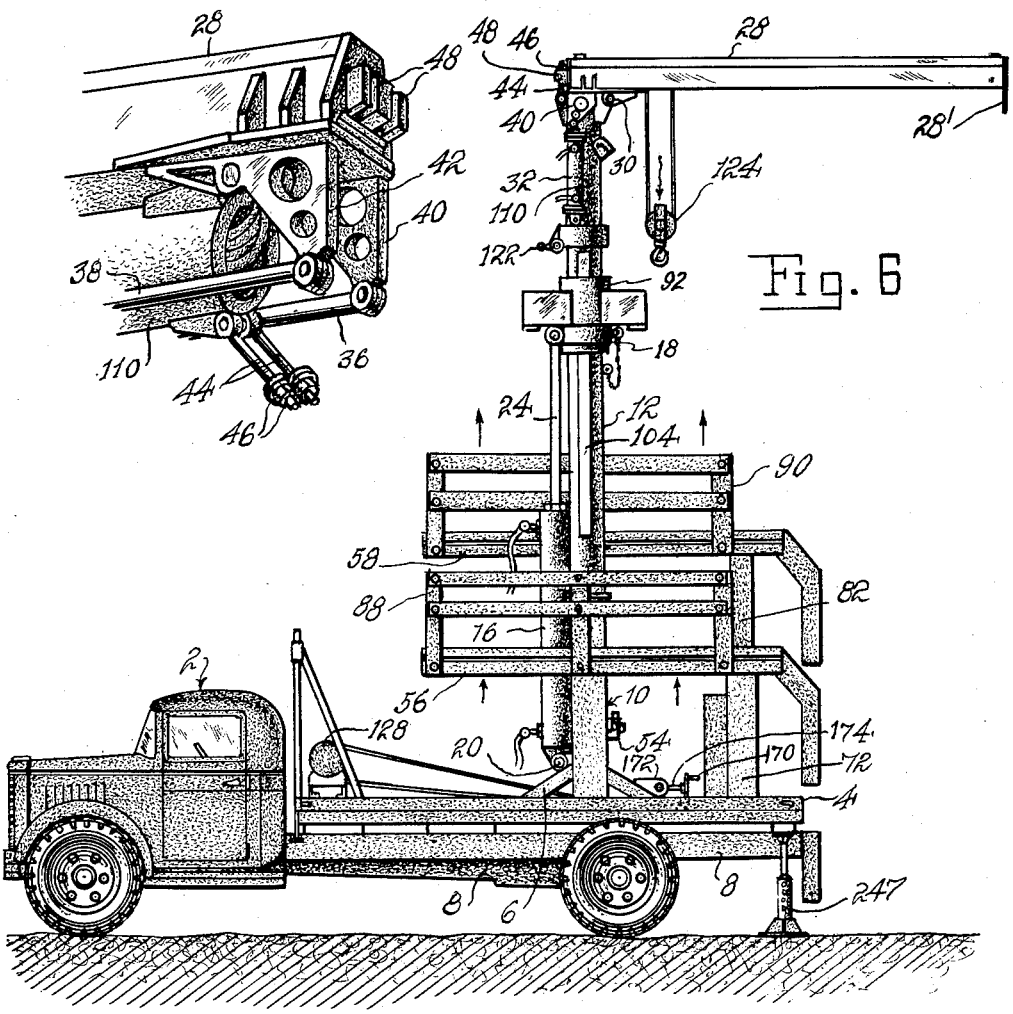

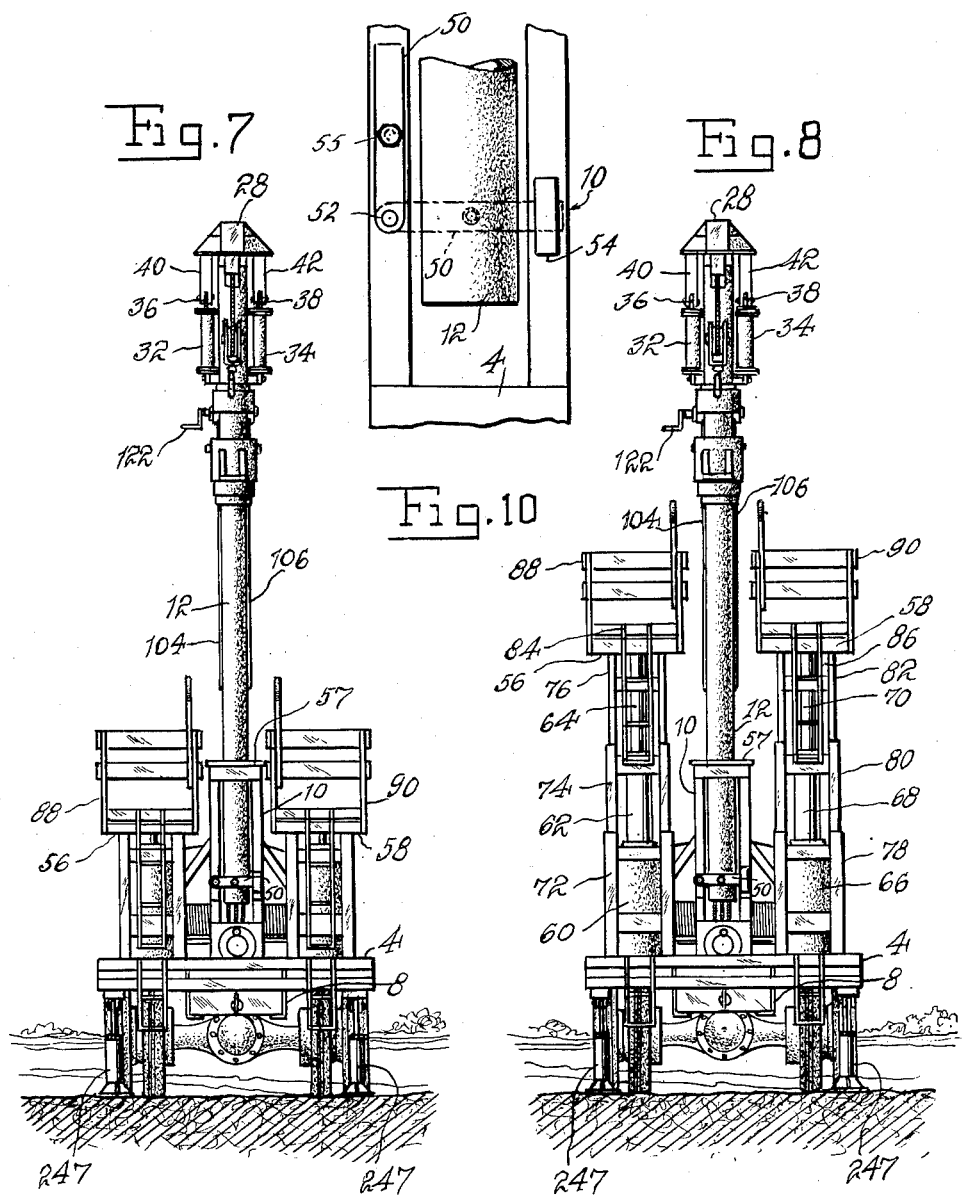

Feb. 18, 1964     F. LA BARRE, JR     3,121,499
AIRCRAFT PROPELLER HANDLING UNIT
Filed Oct. 7, 1960     11 Sheets-Sheet 6
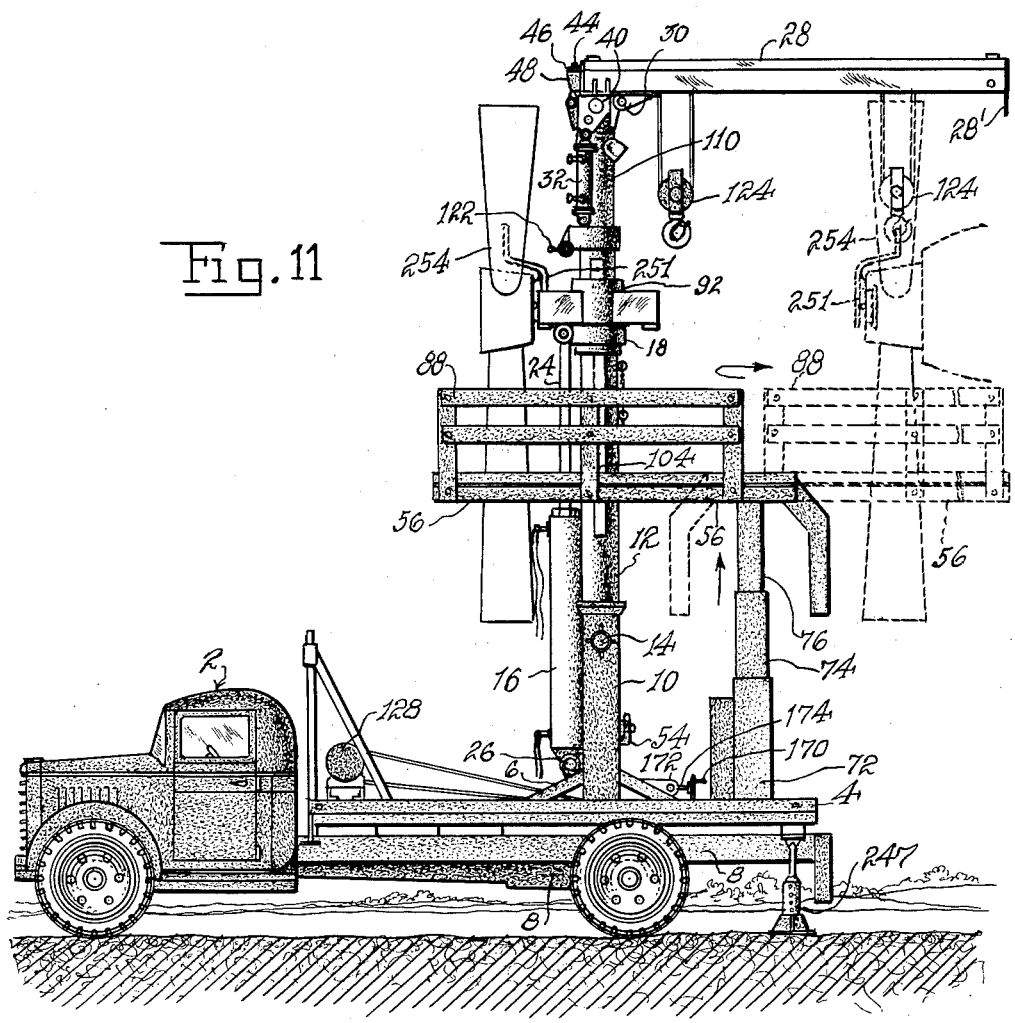
INVENTOR.
FLOYD La BARRE Jr.
BY
*William V. Ebs*
ATTORNEY.

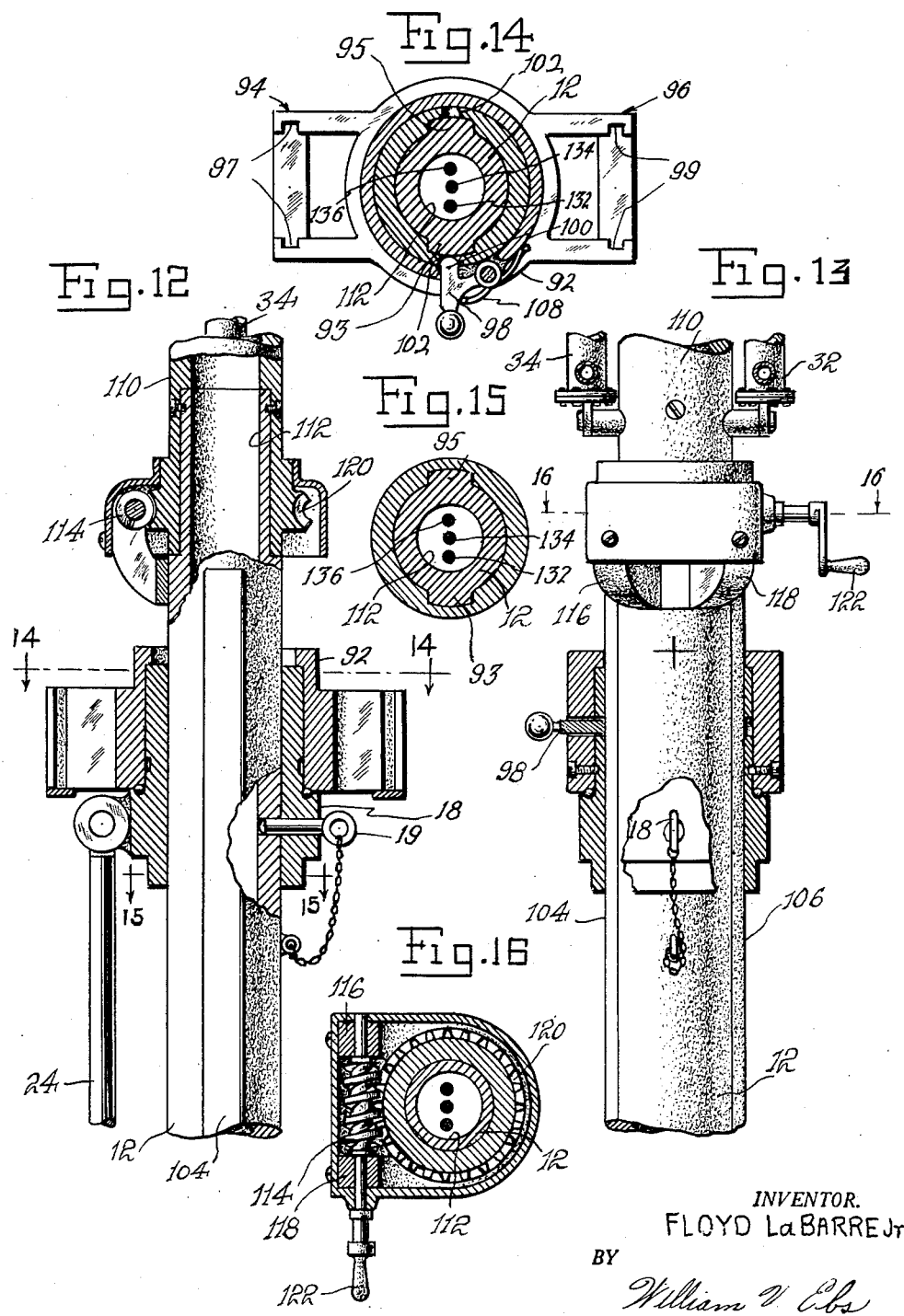

Feb. 18, 1964  F. LA BARRE, JR  3,121,499
AIRCRAFT PROPELLER HANDLING UNIT
Filed Oct. 7, 1960  11 Sheets-Sheet 8
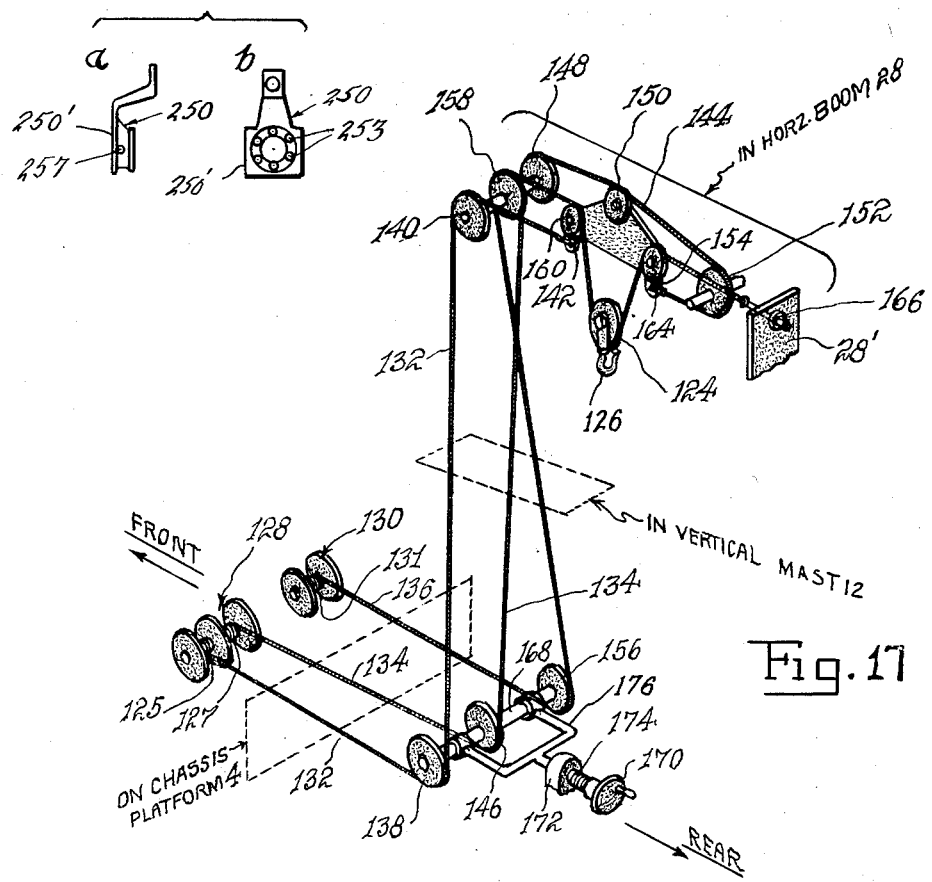
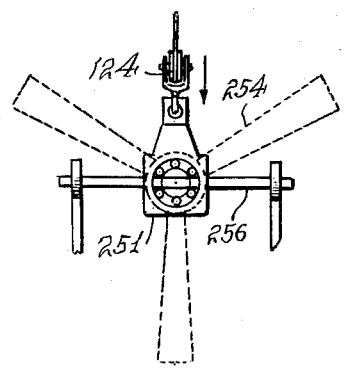
INVENTOR.
FLOYD La BARRE Jr.
BY William V. Ebs
ATTORNEY.

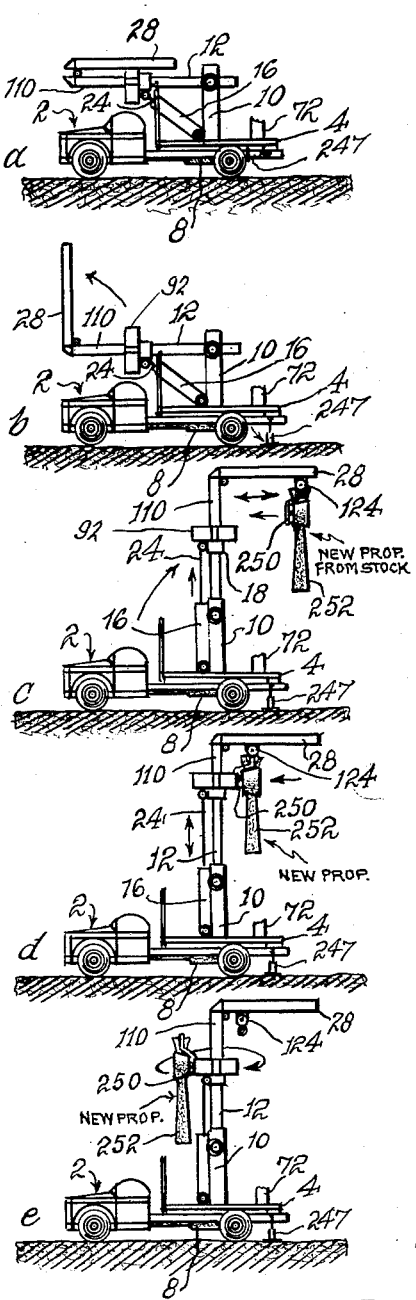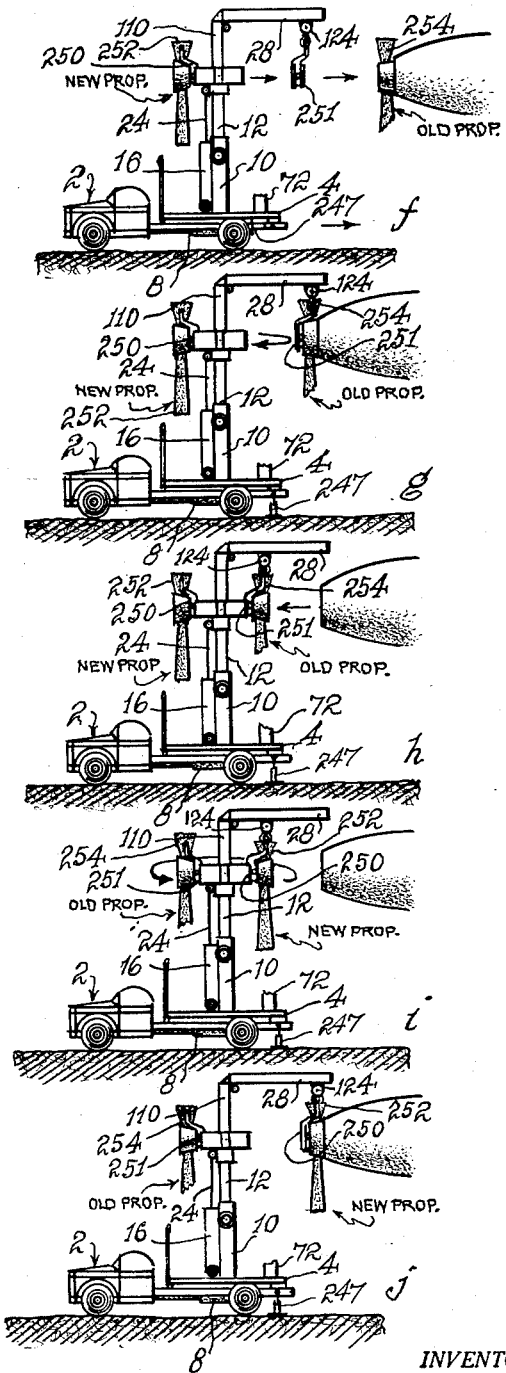
Fig. 18

Feb. 18, 1964 F. LA BARRE, JR 3,121,499
AIRCRAFT PROPELLER HANDLING UNIT
Filed Oct. 7, 1960 11 Sheets-Sheet 11

INVENTOR.
FLOYD La BARRE Jr.
BY
ATTORNEY.

United States Patent Office 3,121,499
Patented Feb. 18, 1964

3,121,499
AIRCRAFT PROPELLER HANDLING UNIT
Floyd La Barre, Jr., Morris Plains, N.J., assignor to Curtiss-Wright Corporation, a corporation of Delaware
Filed Oct. 7, 1960, Ser. No. 61,207
5 Claims. (Cl. 214—1)

My invention relates to a propeller handling unit particularly suitable for use in the installation, removal and transportation of aircraft propellers.

The propeller handling unit of the invention includes a conveyance, preferably automotive, upon which is mounted a boom and mast. The boom and mast are collapsible to horizontal positions, but when the unit is in use the mast is substantially vertical and the boom extends outwardly from it parallel to the ground. Support means for two propellers is mounted on the mast and propeller carrying mechanism for moving a propeller toward or away from the support means suspends from the boom when the mast and boom are in erected positions. The support means and carrying means are relatively movable such that one or the other of the propellers on the support means may be aligned with the carrying means. The conveyance includes working platforms which may be raised and lowered or turned through a 180° arc as may be required.

A prime object of the invention is to provide a propeller handling unit with which the task of replacing a propeller on an aircraft may be accomplished with ease and in a minimum amount of time.

Another object of the invention is to provide a propeller handling unit capable of transporting a replacement propeller to an aircraft, of handling both such replacement propeller and an installed propeller at the aircraft such that the installed propeller may be readily removed from the aircraft and the replacement substituted for it, and of thereafter transporting the removed propeller to a location for repair, overhaul or disposal.

Still another object of the invention is to provide a self-sufficient device of the described type having a common power source for driving the conveyance and for operating various propeller handling components of the unit.

Figure 4:
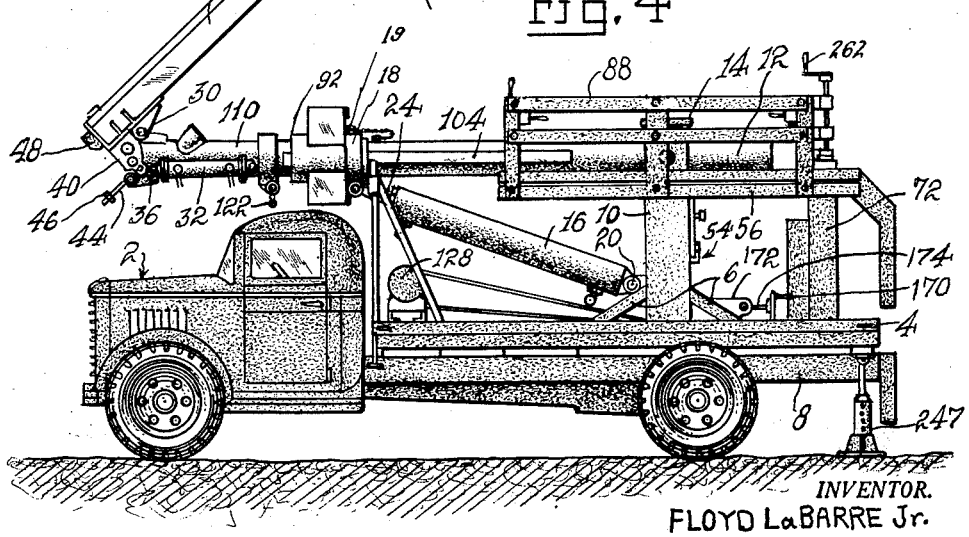
Figures 19, 20:
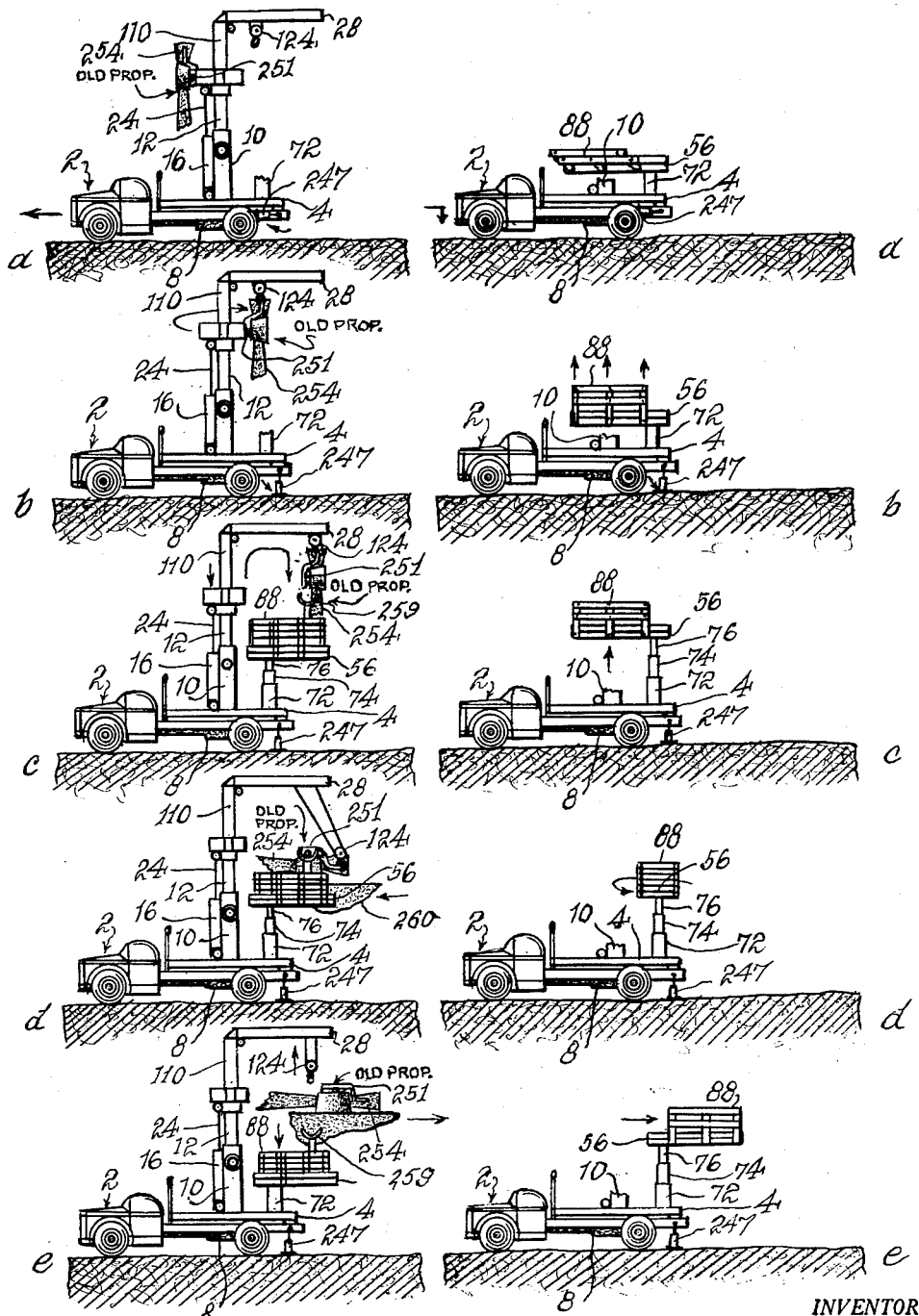
Figure 21:
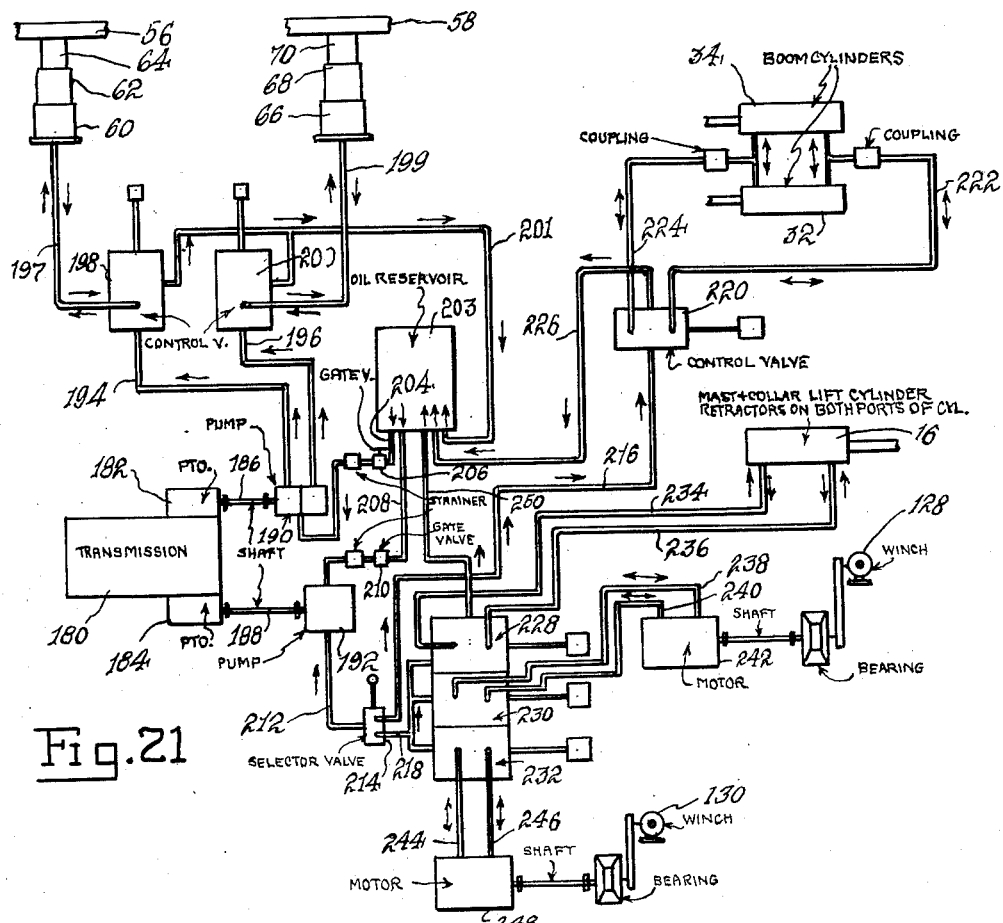
Figures 24, 25:
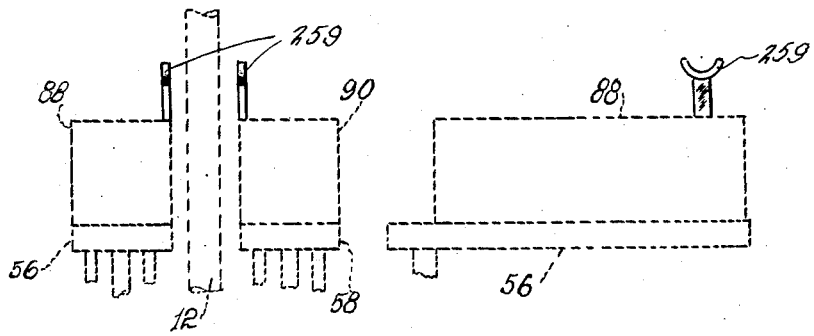

Other objects and advantages of the invention will become apparent during a reading of the specification taken in connection with the accompanying drawings in which:

FIG. 1 is a side view of the propeller handling unit of the invention shown with various propeller handling components in stowed positions, FIG. 2 is a side view of the unit shown partially disassembled, FIG. 3 is a side view of the propeller handling unit shown preparatory to raising the boom and mast, FIG. 4 is a similar view showing the boom in the process of being raised, FIG. 5 is a similar view showing the mast in the process of being raised, FIG. 6 is a side view showing the mast in a vertical position and working platforms in the process of being raised, FIG. 7 is a rear end view of the propeller handling unit in the erected condition with work platforms in lowered positions, FIG. 8 is a view similar to FIG. 7 showing the working platforms in raised positions, FIG. 9 is an enlarged perspective view showing portions of the mast and boom as they appear in their collapsed positions, FIG. 10 is a rear end view showing mechanism for locking the mast in the vertical position, FIG. 11 is a side view of the propeller handling unit in the erected position indicating the manner of operating the working platforms, FIG. 12 is an enlarged fragmentary side view partially in section of the mast and propeller supporting means, FIG. 13 is an enlarged fragmentary rear end view partially in section of the mast and propeller support means, FIG. 14 is a cross sectional view taken on the plane of the line 14—14 of FIG. 12, FIG. 15 is a cross sectional view taken on the plane of the line 15—15 of FIG. 12, FIG. 16 is a cross sectional view taken on the plane of the line 16—16 of FIG. 13, FIG. 17 is a more or less diagrammatic perspective view showing pulley and cable arrangements for operating propeller carrying mechanism of the boom, FIG. 18, a–j, is a diagrammatic showing illustrating operation of the propeller handling unit in replacing an aircraft propeller, FIG. 19, a–e, is a diagrammatic showing illustrating the steps involved in unloading a propeller from the propeller handling unit of the invention, FIG. 20, a–e, is a diagrammatic showing illustrating movements of the working platforms, FIG. 21 is a diagrammatic view showing a hydraulic actuating system utilized in operating various components of the propeller handling unit of the invention, FIGS. 22a and 22b are side and face views respectively of an adapter permitting attachment of the carrying mechanism of the boom to a propeller, FIG. 23 is a rear end view illustrating a pivot bar and the manner in which it is used to unload a propeller from the propeller handling unit of the invention, FIG. 24 is a rear end view showing support means for the pivot bar used in unloading a propeller, FIG. 25 is a side view showing the support means for the pivot bar.

Referring to the drawings, reference character 2 designates a truck of suitable load carrying capacity, size and configuration for the function it is intended to perform as described herein. Mounted upon a horizontal platform 4 as by angle irons 6 and supported by the truck chassis 8 is an upright structure 10. Structure 10 pivotally supports a mast 12 at 14, the mast being able to pivot about the pivotal axis at 14 between a lowered substantially horizontal and a raised substantially vertical position. Mechanism for raising and lowering the mast includes a hydraulic cylinder 16 and a mast collar 18. The collar 18 is mounted for slidable movement on the mast 12, but during raising and lowering of the mast is secured against any such longitudinal motion by means of pin 19. The cylinder 16 is pivotally mounted at 20 on a bracket 22 secured to support structure 10. The mast 12 is raised by pressurizing one end of cylinder 16 such that piston rod 24, which pivotally connects at 26 with the collar 18, moves outwardly from the cylinder to pivot the mast toward the vertical about its pivotal axis at 14 (see FIG. 5). As the mast raises, cylinder 16 pivots about its pivotal axis at 20 and attains a vertical position when the mast is vertical. The mast is lowered by pressurizing the other end of cylinder 16 such that piston rod 16 moves into the cylinder causing mast 12 to pivot toward the horizontal.

The mast 12 supports a boom 28 which is pivotally mounted thereon at 30. This boom 28 is collapsible into a lowered horizontal attitude as shown for example in FIG. 3, but may be raised to extend at right angles to the mast 12. Raising of the boom is accomplished by pressurizing each of hydraulic cylinders 32 and 34 at one end such that piston rods 36 and 38 of the cylinders 32 and 34 respectively, move into the cylinders forcing attached boom brackets 40 and 42 counterclockwise about the pivotal axis 30 as viewed in FIG. 4 whereby the boom is caused to assume a raised attitude. The boom is lowered by pressurizing the other end of the cylinders so as to cause the piston rods 36 and 38 to move outwardly from the cylinders and thereby produce clockwise rotation of the boom 28 about pivotal axis 30. The mast and boom, as well as various other components of the propeller handling unit, are controlled by a hydraulic control system hereinafter described.

Assuming the mast 12 and boom 28 are to be raised from horizontal stowed positions as shown in FIG. 1, normal procedure involves first raising the boom and locking it in the raised position to the mast, after which the mast is raised and secured in the vertical position. After raising, the boom is locked to the mast by means of bolts 44, nuts 46 and brackets 48 (FIG. 9). The mast 12 is secured in its vertical position against counterclockwise rotation, as viewed for example in FIG. 6, about its pivotal axis with the aid of the bar 50 pivoted on structure 10 at 52, which bar is moved into a horizontal position in bracket 54 on support structure 10 when the mast attains an upright position (FIG. 10). When the bar is in position a bolt 55 is tightened through the bar 50 against the mast 12. Clockwise rotation of the mast from the vertical is prevented by upper horizontal portion 57 of structure 10 (FIGS. 7 and 8).

Working platforms 56 and 58 are provided for opposite sides of the mast. These platforms may be raised and lowered by telescoping cylindrical sections 60, 62, 64 and 66, 68, 70 (FIG. 8) which are positioned by suitably controlling fluid pressure thereto. The cylindrical sections 60, 62 and 64 are encased and protected by telescoping framework including pieces 72, 74 and 76. Telescoping sections 66, 68 and 70 are similarly encased and protected by telescoping framework including 78, 80 and 82. The telescoping parts of the framework associated with each of the working platforms are moved apart or contracted as the platforms are raised and lowered. As shown, each of the platforms includes ladders designated by reference characters 84 and 86 which ladders suspend from the floors of the platforms as shown. Collapsible railings 88 and 90 are provided for the platforms 56 and 58 respectively. The platforms are each capable of being rotated through a 180° arc, but in the collapsed condition of the propeller handling unit as shown in FIG. 1 the platforms are stowed in forward positions. In such collapsed condition of the unit the working platforms are also stowed in their lowered positions and the railings are in a collapsed horizontal attitude. When readying the unit for use, the railings are raised by hand power and then locked in a raised attitude by suitable means not shown. Normally this is done after raising of the mast and boom.

As mentioned hereinbefore the mast 12 is provided with a slidably mounted collar 18. The collar 18 however is not subject to rotation. Mast 12 may be provided with flanges 93 and 95 registrable in channels in the collar 18 or any other suitable arrangement may be employed to guide the movements of collar 18. The collar 18 rotatably supports a second collar 92 which includes diametrically opposed frames 94 and 96 (see FIGS. 12 and 13). Each of the respective frames 94 and 96 is formed to receive an adapter which may be fixedly secured to a propeller such that two propellers may be readily mounted on the collar 92 in this manner. The frames 94 and 96 are formed with grooves at 97 and 99 respectively to receive the adapter. The collar 92, in addition to being rotatable in relation to the collar 18, may be moved along the mast 12 when pin 19 is withdrawn from its locking position in which it extends into pre-aligned openings in collar 18 and mast 12. The collars 18 and 92 are positioned along the mast by suitably regulating pressure within cylinder 16 and may be moved in either direction along mast 12 to a desired height when the mast is in a vertical position to position the collar 92 at the level of a propeller on an aircraft. The collar 92 includes a locking lever 98 having a projecting portion 100 which is registrable with recesses 102 formed in collar 18 (FIG. 14). By means of the locking lever 98 the collar 92 may be locked rotationally in one of two positions 180° apart with one or the other of the frames 94 and 96 extending rearwardly from the mast, it merely being necessary to position the collar for the insertion of projection 100 in the proper recess 102. As indicated, the locking lever 98 is biased inwardly by a spring 108, that is in the direction required to maintain the projection 100 on the locking lever in the recesses 102 of the collar 18.

The mast 12 is provided with an upper section 110 which is rotatable relative to the lower section designated by reference character 112. Mechanism for rotating the upper section of the mast includes the worm gear 114 which is mounted in bearings 116 and 118 that are fixed in structure secured to the lower portion of the mast 112 (FIG. 16). The worm gear 114 engages pinion 120 which is shown as integral with the upper portion of the mast 110. In order to rotate the upper portion of the mast 110 it is merely necessary to rotate the worm gear 114 as by handle 122, the resulting direction of rotation of the mast 110 depending upon the direction which the handle is turned. Normally it is only necessary to rotate the upper portion of the mast 110 a small amount. The purpose of providing for such rotation is to enable positioning of the boom 28 to permit accurate alignment of propeller carrying means suspended from the boom with a propeller on an aircraft.

When the mast is in its upright position, a pulley block 124, including hook 126, suspends from the boom 28. Such pulley block may be moved either parallel to the ground or vertically by hydraulically operated winches 128 and 130. As shown, winch 128 has two drums 125 and 127, whereas winch 30 has but one drum 131 (see FIG. 17). The winches and pulley block 124 connect through cables and sheaves. Cables 132 and 134 are employed for moving the pulley block 124 horizontally in one direction or another, whereas cable 136 is employed for moving the pulley block vertically. Cable 132 is wound on drum 125 of the winch 128. The cable 132 extends over sheaves 138 and 140, and attaches at 142 to a movable carriage 144. The cable 134 is wound on drum 127 and extends over sheaves 146, 148, wheel 150 and sheave 152, and attaches to the carriage at 154. Cable 136 is wound on the winch 130 and extends over sheaves 156, 158, wheel 160, pulley block 124 and wheel 164 and attaches at 166 to the end plate 28' of the boom. Cables 132, 134 and 136 all extend through the mast 12 as indicated, for example, in FIGS. 14, 15 and 16.

The sheaves 138, 146 and 156 are rotatably mounted on a non-rotatable shaft 168 which shaft may be longitudinally adjusted on the truck chassis by means of wheel 170 to take up slack in the cables. The adjusting mechanism comprises a fixed bracket 172 having a tapped hole which meshes with the threads of a screw rod 174. One end of the screw rod includes the wheel 170 as an integral part thereof, whereas the other end of the screw rod connects with structure 176, through a suitable coupling (not shown), permitting relative rotation of the connected parts. Structure 176 is affixed to shaft 168. Sheaves 140, 158 and 148 are rotatably mounted upon shaft 176 which is affixed in any suitable manner to the boom structure. Sheave 152 is rotatably mounted on the shaft 178, which is affixed near the free end of the boom structure. The wheels 142, 150 and 164 are rotatably mounted in the carriage 144. The carriage is mounted on rollers in conventional fashion in the boom such that it may be easily moved horizontally in the boom and whereby vertical forces acting on the pulley block 124 are transferred to the boom structure.

The cables 132 and 134 are oppositely wound on the two drums of the winch 128 such that when one cable is wound on its drum the other cable unwinds and vice versa. Assuming a clockwise rotation of the winch 128, cable 132 is wound on its drum and cable 134 is unwound. The tension produced in cable 132 moves the carriage 144 to the left as viewed in FIG. 17 with the slack in cable 134 being taken up by the motion of the carriage. Counterclockwise rotation of winch 128 winds the cable 134 on its drum and slackens cable 132. The tension in cable 134 acts to move the carriage 144 to the right and the slack in cable 132 is taken up in the motion of the carriage. Assuming no motion of the winch 130, pulley block 124 remains suspended at a fixed height and follows the motion of the carriage 144. As is obvious from the drawing, clockwise rotation of the winch 130 results in the lowering of the pulley block 124 and counterclockwise rotation of the winch results in raising the pulley block.

As has been indicated, fluid pressure is employed for raising the mast, the boom and the working platforms, as well as for operating the winches which control the propeller carrying means, suspended from the boom. The power source for generating the fluid pressure is the engine of the truck. As shown in FIG. 21, the transmission 180 of the vehicle connects through power take-off gearing 182 and 184 and shafts 186 and 188 with pumps 190 and 192. Pump 190 has two outlets which connect over fluid pressure lines 194 and 196 with control valves 198 and 200. These control valves regulate pressure in lines 197 and 199 which connect with lift cylinders 60, 62, 64 and 66, 68, 70 for working platforms 56 and 58. In one position of valve 198 line 194 is connected to line 197 so as to provide fluid pressure to lift cylinders 60, 62, 64 and thereby raise platform 56. In a corresponding position of valve 194 line 196 is connected to line 199 such that cylinders 66, 68 and 70 may be pressurized to raise platform 58. In other positions of valves 198 and 200 lines 197 and 199 connect with line 201 which leads to oil reservoir 202 such that pressure in the lift cylinders may decrease and the working platforms lower. The oil reservoir connects over line 204 including gate valve 206 with the pump 190 and over line 208, including gate valve 210 with the pump 192.

As shown, pump 192 connects over line 212 with selector valve 214. The selector valve may be positioned to provide fluid pressure to operate the boom raising cylinders or it may be moved into an alternate position to provide fluid pressure for the operation of mast and collar lift cylinder 16, as well as for the winches 128 and 130. As shown, selector valve 214 has two outlet lines 216 and 218, only one of which may be pressurized by the pump 192 at any one time depending upon valve position. The line 216 connects with control valve 220 which regulates pressure in lines 222 and 224, connecting with opposite ends of boom cylinders 32 and 34. The control valve 220 is operable to connect line 216 with either line 222, which connects with one side of cylinders 32 and 34 or with line 224 which connects with the other sides of cylinders 32 and 34. Assuming selector valve 214 has been operated to connect lines 212 and 216, when the valve 220 is positioned to connect line 216 with line 222, line 224 connects through the valve and over line 226 with reservoir 202 and the boom raises. When the valve 220 is positioned to connect line 216 with line 224, line 222 connects through the valve and over line 226 with the reservoir 202 and the boom lowers.

Outlet line 218 of selector valve 214 connects with control valves 228, 230 and 232. Valve 228 regulates pressure in lines 234 and 236 which connect with opposite ends of mast and collar lift cylinder 16. Valve 230 controls pressure in lines 238 and 240 which connect with hydraulic motor 242, the motor being employed to operate winch 128. Valve 232 controls pressure in lines 244 and 246 connected with hydraulic motor 248 which operates winch 130. Assuming valve 214 to have been operated so as to connect lines 212 and 218, in one position of valve 228 line 234 connects with line 218 to pressurize one end of cylinder 16 and thereby cause collar 18 to be moved outwardly along the mast 12. At such time line 236 is connected through valve 228 over line 250 with oil reservoir 202 such that fluid in the other end of cylinder 16 may be exhausted to the reservoir. In the other position of valve 228 line 236 is connected to line 218, and line 234 is connected to the oil reservoir 202 through the valve to cause movement of the collar in the opposite direction along the mast 12. Valves 230 and 232 operate in a similar manner to the valve 228. In one position of the valve 230 line 238 is connected to line 218 and line 240 is connected through the valve 230 to the oil reservoir 202. This results in rotation of the hydraulic motor 242 and winch 128 in one direction. In the other position of valve 230 line 240 is connected to line 218 and line 238 is connected to the oil reservoir, with the result that the hydraulic motor 242 and winch 128 are caused to rotate in the opposite direction. Valve 232 is operable to connect one of the lines 244 or 246 to the line 218 and to simultaneously connect the other of the lines to the oil reservoir 202 to operate the motor 248 and winch 130 in one direction or the other depending upon valve position.

Controls for operating the hydraulic system may be mounted in any suitable location on the propeller handling unit of the invention affording reasonable access by an operator. A convenient location for controls to operate the valves 214, 220, 228, 230 and 232, by means of which the boom cylinders 32 and 34, the mast and collar lift cylinder 16 and the winches 128 and 130 may be controlled, is at the rear of the truck chassis. Preferably duplicate controls are provided on one of the working platforms 66 or 68 for operating valves 228, 230 and 232 such that the position of the collar 18 on the mast 12, as well as the position of the carriage 144 and pulley block 124, may be controlled from this location. An engine speed control is preferably provided both at the rear of the truck chassis and on one of the working platforms such that engine speed may be regulated to control fluid pressure delivered by pumps 190 and 192 of the hydraulic system.

The manner in which the propeller handling unit of the invention is utilized to replace a propeller on an aircraft may be best understood by reference to FIG. 18 of the drawings. Assuming the mast 12 and boom 28 are in the collapsed positions (FIG. 18a), the boom 28 is first raised (FIG. 18b) and then the mast 12. The truck is positioned to enable the replacement propeller to be picked up from stock, after which jacks 247, pivoted on the truck chassis as at 249 are lowered from horizontal positions to provide support for the rear end of the truck. The propeller carrying mechanism of the boom, including pulley block 124 and hook 126, are used in connection with an adapter 250 to pick up the replacement propeller 252 from stock (FIG. 18c). The adapter is bolted to the propeller for the pick-up through openings 253 in the adapter which align with tapped holes normally provided in the propeller hub (see FIG. 22). The propeller handling mechanism of the boom and the mast collar 92 are manipulated as required to mount the adapter 250 with propeller 252 on one or the other of frames 94 and 96 of collar 92 (FIG. 18c). Adapter and propeller are affixed on the collar by sliding flange 250' of adapter 250 into the grooves of the frame as, for example, grooves 99 of frame 96 (FIGS. 22, 14 and 18d). The collar 92 is turned through a 180° arc so that it cannot interfere with the propeller handling mechanism of the boom (FIG. 18e). The jacks 247 are raised and the truck 2 is driven to the aircraft from which an old propeller 254 is to be removed.

At the site of the aircraft the truck is backed into position (FIG. 18f), the jacks 247 are lowered, and the propeller handling mechanism of the boom is adjusted to align a second adapter 251 (similar to adapter 250) with the old propeller 254. A slight rotational adjustment of the boom may be required and this may be accomplished in the manner hereinbefore described. After the old propeller has been readied for removal the adapter 251 is secured in place on the propeller 254 (FIG. 18g) and the propeller handling mechanism of the boom operated to move propeller 254 toward collar 92. The adapter 251 with propeller 254 are mounted on frame 94 of collar 92 (FIG. 18h). The carrying mechanism of the boom is disconnected from adapter 251 and the collar 92 is rotated to bring the replacement propeller 252 under the boom 28 (FIG. 18i). The propeller handling mechanism of the boom is then attached to the adapter 250. Propeller 252 is removed from its position on the collar 92 by the propeller handling mechanism of the boom and is conveyed thereby into position for assembly onto the aircraft engine shaft (FIG. 18j). Adapter 252 is disassembled from propeller 252 when the propeller is secure.

After the new propeller has been installed, the truck jacks are raised whereupon the truck 2 may be moved off to transport the propeller 254 to a desired location as for reworking or repair (FIG. 19a). Removal of the propeller is accomplished after lowering of the jacks 247, by first rotating the collar 92 to position the propeller 254 under the boom (FIG. 19b). The propeller handling mechanism of the boom is then secured to the adapter 251 and the propeller is removed from the collar 92 (FIG. 19c). A bar 256 is inserted through an opening (such as shown at 257 in FIG. 22) in the adapter and the propeller 254 is manipulated by the propeller handling mechanism of the boom in such fashion that the bar 256 comes to rest on supports 259 (FIGS. 24 and 25). The propeller is caused to be tilted about the bar 256 and between the platforms (FIG. 19d) whereby the propeller may be generally lowered onto a platform 260 (FIG. 19e).

The working platforms 56 and 58 have been eliminated from the showings in FIGS. 18 and 19 (except for FIGS. 19c–e) for purposes of clarity. The working platforms are operated during the described propeller handling operations as required. Normal functions of the working platforms are depicted in FIGS. 20a–e. In stowed positions, the railings of the platforms are in a horizontal attitude (FIG. 20a). When the platforms are to be used the railings are raised (FIG. 20b) and locked in position to afford protection to workmen. The platforms are raised from lowered positions in which they are normally stowed by the controls mentioned hereinbefore, to a required height for workmen. That is, to place the workmen at the proper lever for handling the propellers and propeller handling mechanism of the unit. The working platforms are most conveniently raised and lowered when in use by controls on one of the platforms. It is necessary to rotate the platforms through a 180° arc during the prescribed procedure which is involved in accomplishing the replacement of a propeller on an aircraft (FIGS. 20d and e). The platforms are normally disposed in forward positions for the purpose of handling propellers on the mast collar, but need to be reversed to rearward positions for handling the propellers at an engine nacelle (see FIG. 11). The platforms 56 and 58 are rotatably mounted on top of lifting cylinders 64 and 70. Turning of the platforms 56 and 58 is accomplished by rotating handles, such as handle 262 (FIGS. 3 and 4), on the respective platforms, which handles connect through suitable gearing (not shown) with engaging elements affixed to the platforms.

It will be clear to those skilled in the art that various changes and modifications may be made in the structure shown and described without departing from the spirit and scope of the invention as set out in the appended claims.

I claim:
1. A propeller handling unit comprising a conveyance, a mast pivotally mounted on the conveyance for movement between a substantially horizonal and a substantially vertical position, support means for two propellers, said support means being slidable on the mast, means for securing the support means against motion along the mast, means for actuating the support means to thereby raise the mast from said substantially horizontal to the substantially vertical position when said support means is secured against motion along the mast, a boom on the mast, and carrying means on the mast for moving a propeller toward or away from the support means, said support means and carrying means being relatively movable whereby one or the other of the propellers on the support means may be aligned with the carrying means.

2. The combination as defined in claim 1 including means for moving the carrying means substantially parallel to the mast when the mast is in its substantially vertical position.

3. The combination as defined in claim 1 wherein the support means is movable along the mast when the mast is in the vertical position and the support means is rotatable on the mast.

4. The combination as defined in claim 1 including a common source of power for driving the conveyance and providing motive power for raising the mast.

5. A propeller handling unit comprising a conveyance, rotatable support means on the conveyance for two propellers, said support means having a substantially vertical axis of rotation, propeller carrying means movable radially with respect to the axis of rotation of the support means, and a working platform on the conveyance movable independently of the support means both in a direction parallel to said axis of rotation and around one of a pair of spaced subsantially vertical axes, a second working platform on the conveyance also movable independently of the support means, both parallel to said axis of rotation and around the other of said pair of spaced substantially vertical axes, the platforms being swingable through substantially 180° from forward positions on the conveyance to rearward positions, said platforms being spaced apart in the forward and rearward positions to accommodate a propeller therebetween, and rigid support means projecting from each of the platforms to support the propeller therebetween for tilting movement.

References Cited in the file of this patent

UNITED STATES PATENTS

| | | |
|---|---|---|
| 2,375,104 | Heitshu | May 1, 1945 |
| 2,409,468 | Bock | Oct. 15, 1946 |
| 2,413,909 | Clement | Jan. 7, 1947 |
| 2,468,884 | L'Esperance | May 3, 1949 |
| 2,536,614 | Syracusa | Jan. 2, 1951 |
| 2,620,930 | Mullgart | Dec. 9, 1952 |
| 2,786,581 | Balogh | Mar. 26, 1957 |

FOREIGN PATENTS

| | | |
|---|---|---|
| 739,232 | Germany | Sept. 15, 1943 |